US012743256B2

(12) United States Patent
Ma et al.

(10) Patent No.: US 12,743,256 B2
(45) Date of Patent: Sep. 22, 2026

(54) INTERACTION WINDOW DISPLAY METHOD AND APPARATUS, DEVICE, AND STORAGE MEDIUM

(71) Applicant: BEIJING ZITIAO NETWORK TECHNOLOGY CO., LTD., Beijing (CN)

(72) Inventors: Ruifeng Ma, Beijing (CN); Yuan Xu, Beijing (CN); Xiaobo Huang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 313 days.

(21) Appl. No.: 18/567,619

(22) PCT Filed: May 24, 2022

(86) PCT No.: PCT/CN2022/094643
§ 371 (c)(1),
(2) Date: Dec. 6, 2023

(87) PCT Pub. No.: WO2023/273700
PCT Pub. Date: Jan. 5, 2023

(65) Prior Publication Data

US 2024/0272879 A1 Aug. 15, 2024

(30) Foreign Application Priority Data

Jun. 29, 2021 (CN) ......................... 202110729935.3

(51) Int. Cl.
*G06F 8/34* (2018.01)
*G06F 3/0482* (2013.01)
*G06F 9/54* (2006.01)

(52) U.S. Cl.
CPC .............. *G06F 8/34* (2013.01); *G06F 3/0482* (2013.01); *G06F 9/541* (2013.01)

(58) Field of Classification Search
CPC ........... G06F 3/0482; G06F 8/34; G06F 9/541
(Continued)

(56) References Cited

U.S. PATENT DOCUMENTS 6,144,962 A 11/2000 Weinberg et al.
8,522,167 B2 * 8/2013 Zhang ..................... H04L 41/22 715/853

(Continued)

FOREIGN PATENT DOCUMENTS

CN 1756188 A 4/2006
CN 101196818 A 6/2008

(Continued)

OTHER PUBLICATIONS

Yuan et al., “Research on Data Link Ontology Mapping Algorithm Based on Bayesian Network Model”, 2019, IEEE Access, vol. 7, pp. 185698-185709. (Year: 2019).*

(Continued)

*Primary Examiner* — Ted T. Vo
(74) *Attorney, Agent, or Firm* — Astute IP Law Group

(57) ABSTRACT

Embodiments of the present disclosure provide an interaction window display method and apparatus, a device, and a storage medium. The method includes: first, in response to an interaction window display operation, obtaining node structure data, the node structure data comprising node information stored according to a preset data structure, and the node structure data being used for enabling the node information to be displayed in a target interaction window on the basis of the preset data structure; and then displaying the target interaction window on the basis of the node structure data and an interaction window framework.

19 Claims, 3 Drawing Sheets

(58) Field of Classification Search
USPC .................................................. 717/104–113
See application file for complete search history.

(56) References Cited

U.S. PATENT DOCUMENTS

| | | | | |
|---|---|---|---|---|
| 2014/0201331 | A1* | 7/2014 | Kershaw ............... | H04L 41/509 709/219 |
| 2014/0282364 | A1 | 9/2014 | Woodward | |

FOREIGN PATENT DOCUMENTS

| | | | |
|---|---|---|---|
| CN | 104750738 | A | 7/2015 |
| CN | 109491736 | A | 3/2019 |
| CN | 109542422 | A | 3/2019 |
| CN | 111949346 | A | 11/2020 |
| CN | 112084315 | A | 12/2020 |
| CN | 112711677 | A | 4/2021 |
| WO | 1988007719 | A2 | 10/1988 |

OTHER PUBLICATIONS

Xinao Shuneng Technology, “Data display method and device of tree structure, electronic equipment and medium”, Mar. 2021, CN patent No. CN112464039A, retrieved from Google Patent, 8 pages. (Year: 2021).*

International Search Report (with English translation) and Written Opinion issued in PCT/CN2022/094643, dated Aug. 10, 2022, 12 pages provided.

Office Action received for Chinese Patent Application No. 202110729935.3, mailed on Feb. 6, 2026, 20 pages (10 pages of English Translation and 10 pages of Original Document).

* cited by examiner

Memory
602
Input device
603
Processor
601
Output device
604

INTERACTION WINDOW DISPLAY METHOD AND APPARATUS, DEVICE, AND STORAGE MEDIUM

CROSS-REFERENCE TO RELATED APPLICATIONS

This application is a U.S. National Stage under 35 U.S.C. § 371 of International Application No. PCT/CN2022/094643, as filed on May 24, 2022, which is based on and claims the priority to the Chinese Patent Application No. 202110729935.3 entitled "INTERACTION WINDOW DISPLAY METHOD AND APPARATUS, DEVICE, AND STORAGE MEDIUM" filed on Jun. 29, 2021. The disclosure of each of these applications is incorporated by reference herein in its entirety.

TECHNICAL FIELD

The present disclosure relates to the field of data display, and in particular, to a method for displaying an interaction window, an apparatus, a device, and a storage medium.

BACKGROUND

Visual programming is a Windows application program development tool that, based on the principle of the programming idea of "what you see is what you get", strives to realize visualization of programming work. Nodes in visual programming are used for implementing sub-functions in the program, and the nodes are connected to realize visual programming; in the process of visual programming, users often need a quick node addition entry to improve the efficiency of visual programming, such as a node addition dialog box.

SUMMARY

In a first aspect, the present disclosure provides a method for displaying an interaction window, comprising:

in response to an operation for displaying an interaction window, acquiring node structure data; wherein the node structure data comprises node information stored in accordance with a preset data structure, and the node structure data is used for causing the node information to be displayed in a target interaction window based on the preset data structure; and displaying the target interaction window based on the node structure data and an interaction window framework.

In an optional implementation, the node information comprises a mapping relation between a node category and node description information.

In an optional implementation, when an addition operation for first node information is detected, determining whether a node category included in the first node information exists in the node structure data;

if it is determined that the node category included in the first node information exists in the node structure data, storing node description information included in the first node information under the node category in the node structure data; and if it is determined that the node category included in the first node information does not exist in the node structure data, adding the node category into the node structure data, and storing the node description information included in the first node information under the added node category.

In an optional implementation, when a deletion operation for second node information is detected, determining a node category included in the second node information in the node structure data, and deleting node description information included in the second node information under the node category.

In an optional implementation, the node description information comprises a corresponding relation between a node name and node function description information; and the displaying the target interaction window based on the node structure data and an interaction window framework comprises:

filling a corresponding relation between the node category and the node name in the node description information into a two-level menu control in the interaction window framework, and filling the corresponding relation between the node name and the node function description information into an information presentation control in the interaction window framework, to generate the target interaction window; and displaying the target interaction window.

In an optional implementation, the preset data structure is a data structure containing a key-value pair relation, wherein the key in the key-value pair relation is used for storing the node category, and the value in the key-value pair relation is used for storing the node description information.

In an optional implementation, the method further comprises: before the in response to an operation for displaying an interaction window, acquiring node structure data, in response to a startup operation for a target visual programming application, acquiring configuration files of nodes corresponding to the target visual programming application; wherein the configuration files include the node information of the nodes; and storing the node information in accordance with the preset data structure, to obtain the node structure data corresponding to the target visual programming application.

In an optional implementation, the method further comprises: after the displaying the target interaction window based on the node structure data and an interaction window framework, when a keyword search operation for the node information is received on the target interaction window, acquiring a search result corresponding to the keyword search operation based on the node structure data; and presenting the search result on the target interaction window.

In an optional implementation, the method further comprises: after the displaying the target interaction window based on the node structure data and an interaction window framework, adding a target node on a visual programming interface based on the target interaction window;

in response to a node information presentation operation for the target node, acquiring the node information corresponding to the target node from the node structure data; and presenting the node information on the visual programming interface.

In an optional implementation, in response to the node information being updated, the node structure data is dynamically updated.

In a second aspect, the present disclosure provides an apparatus for displaying an interaction window, comprising:

a first acquiring module configured to, in response to an operation for displaying an interaction window, acquire node structure data; wherein the node structure data comprises node information stored in accordance with a preset data structure, and the node structure data is used for causing the node information to be displayed in a target interaction window based on the preset data structure; and a displaying module configured to display the target interaction window based on the node structure data and an interaction window framework.

In a third aspect, the present disclosure provides a non-transitory computer-readable storage medium having stored thereon instructions which, when executed on a terminal device, cause the terminal device to implement the above-described method.

In a fourth aspect, the present disclosure provides a device comprising: a processor, and a memory on which a computer program is stored, wherein the computer program, when executed by the processor, causes the processor to implement the above-described method.

In a fifth aspect, the present disclosure provides a computer program product comprising a computer program/instructions which, when executed by a processor, implements/implement the above-described method.

In a sixth aspect, the present disclosure provides a computer program which, when executed by a processor, implements the above-described method.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

In order to more clearly illustrate the embodiments of the present disclosure or technical solutions in the related art, the drawings used in the description of the embodiments or related art will be briefly described below, and it is apparent for those skilled in the art to obtain other drawings from these drawings without paying out creative efforts.

DETAILED DESCRIPTION

Figure 1:
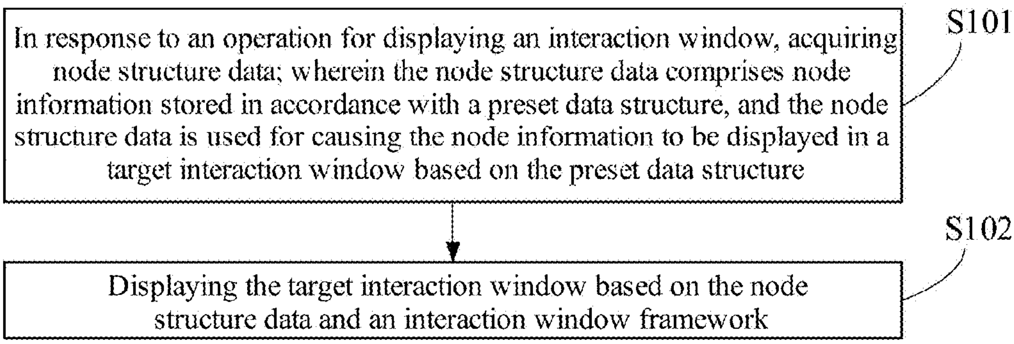
FIG. 1 is a schematic flowchart of a method for displaying an interaction window provided by an embodiment of the present disclosure.

In order that the above objects, features and advantages of the present disclosure may be more clearly understood, solutions of the present disclosure will be further described below. It should be noted that, in the case of no conflict, the embodiments of the present disclosure and features in the embodiments may be combined with each other.

In the following description, numerous specific details are set forth in order to provide thorough understanding of the present disclosure, but the present disclosure may be practiced otherwise than as described herein; apparently, the embodiments in the description are only part of the embodiments of the present disclosure, and not all embodiments.

In visual programming, a quick node addition entry is needed, such as a node addition dialog box; the node addition dialog box includes a search bar, a node category, a node name, node content information, etc.; in visual programming, users can search for nodes to be added through the node addition dialog box, to complete the addition of nodes.

Currently, a way to display a node addition dialog box is to hard-code preset node content into the node addition dialog box; however, when the node content changes, for example, when the node content information is updated, code related to the node content in the node addition dialog box needs to be modified, so that the node content presented in the node addition dialog box is updated, that is, when the node content changes, the version of visual programming software needs to be upgraded to update the node content. If the user does not update the visual programming software in time, the user cannot acquire the latest node content, therefore, it is a technical problem to be solved urgently at present that how to update the node content online when the node information is updated, and synchronously update the content in the node addition dialog box. To this end, the embodiments of the disclosure provide a method for displaying an interaction window, wherein node information is stored in accordance with a preset data structure, and once the node information is updated, the node structure data can be updated based on the preset data structure, so that the node information in a target interaction window displayed based on the node structure data is updated in real time; it can be seen that in the embodiments of the present disclosure, the update of the node content on the target interaction window can be realized without the need of manually updating the software version by the user, which improves the user experience in using the visual programming software.

In order to solve the above technical problem or at least partially solve the above technical problem, the present disclosure provides a method for displaying an interaction window, an apparatus, a device, and a storage medium, wherein, when node information is updated, an update operation can be performed on node structure data storing the node information based on a preset data structure, so that the updated node information can also be presented on a target interaction window displayed based on the updated node structure data. It can be seen that the embodiments of the present disclosure implement the display of the interactive window based on dynamically updated node information, therefore, the node content displayed on the interactive window is also dynamically updated.

Compared with the related art, the technical solutions provided by the embodiment of the present disclosure have at least the following advantages:

The embodiments of the disclosure provide a method for displaying n interaction window, comprising: firstly, in response to an operation for displaying an interaction window, acquiring node structure data; wherein the node structure data comprises node information stored in accordance with a preset data structure, and the node structure data is used for causing the node information to be displayed in a target interaction window based on the preset data structure; and then, displaying the target interaction window based on the node structure data and an interaction window framework. In the method for displaying an interaction window provided by the embodiments of the disclosure, the node information is stored in accordance with the preset data structure, and once the node information is updated, the node structure data can be updated based on the preset data structure, thus the node information in the target interaction window displayed based on the node structure data is updated in real time. It can be seen that in the embodiments of the present disclosure, the node content on the target interaction window can be updated without the need of updating the software version, which improves the user experience in using related software.

FIG. 1 is a schematic flowchart of a method for displaying an interaction window provided by an embodiment of the present disclosure, and as shown in FIG. 1, the method comprises:

S101, in response to an operation for displaying an interaction window, acquiring node structure data, wherein the node structure data comprises node information stored in accordance with a preset data structure, and the node structure data is used for causing the node information to be displayed in a target interaction window based on the preset data structure.

In the embodiments of the present disclosure, the interaction window may include a dialog box, a pop-up window, and the like. When receiving the operation for displaying an interaction window, the node structure data is acquired. Herein, there may include many ways to trigger the operation for displaying an interaction window, for example: Way 1, that a user triggers the operation for displaying an interaction window by clicking a corresponding button; Way 2, that a user triggers the operation for displaying an interaction window by a right click selection, and so on. The specific way to trigger the operation for displaying an interaction window by the user is not limited in the embodiments of the present disclosure.

Herein, the operation for displaying an interaction window can be used for triggering display of the interaction window, and, the interaction window is used for presenting the node information, and the interaction window can be an interaction window for adding a node and the like; in the embodiments of the present disclosure, a user can view the node information and add nodes on the interaction window.

The node structure data in the embodiments of the present disclosure includes the node information stored in accordance with the preset data structure, where the preset data structure may refer to a Map data structure including multiple key-value pairs, wherein each key-value pair is used for storing node information belonging to a same node category. When the node information is updated, an update operation is performed on the node structure data based on the preset data structure, so that the updates of the node information are synchronized into the node data structure, to realize a dynamical update of the node data structure. Therefore, when the operation for displaying an interaction window is received, the acquired node structure data includes the updated node information, that is, the acquired node structure data is updated data.

In an optional implementation, the node information comprises a mapping relation between a node category and node description information.

In the embodiment of the present disclosure, in response to the operation for displaying an interaction window, the acquired node structure data includes a mapping relation between a node category and node description information stored in accordance with a preset data structure. Herein, one node category corresponds to one or more pieces of node description information; when any of the node category or the node description information of the node information is updated, an update operation is performed on the node structure data based on the preset data structure, to obtain the updated node structure data. For example, when there is a update operation of addition for the node description information of the node information, the addition operation is performed on the node structure data based on the preset data structure to obtain the updated node structure data; and when there is a update operation of deletion for the node description information of the node information, the deletion operation is performed on the node structure data based on the preset data structure to obtain the updated node structure data; and so on.

In another optional implementation, the preset data structure is a data structure containing a key-value pair relation, wherein the key in the key-value pair relation is used for storing the node category, and the value in the key-value pair relation is used for storing the node description information, and one key generally corresponds to multiple values, that is, one node category generally includes node description information corresponding to multiple nodes.

In the embodiment of the present disclosure, in response to the operation for displaying an interaction window, the acquired node structure data includes node information stored in accordance with the corresponding relation between a key and a value, wherein the key is used for storing the node category, and the value is used for storing the node description information. When any of the key or the value of the node information is updated, an updated operation is performed on the node structure data based on the data structure of the key-value pair relation to obtain the updated node structure data.

In one optional implementation, the update operation for the node information may include an addition operation, a deletion operation, a modification operation, etc. for the node information.

When the addition operation for first node information is detected, it is determined whether a node category in the first node information exists in the node structure data, and if it is determined that the node category in the first node information exists in the node structure data, the node description information in the first node information is stored under the node category in the node structure data.

In the embodiment of the present disclosure, when the addition operation for node description information of the first node information is detected, firstly it is determined whether the node category in the first node information exists in the current node structure data. Or, when an addition operation for the value of the first node information is detected, firstly it is determined whether the key of the first node information exists in the current node structure data, wherein the key is used for storing the node category. If it is determined that the node category in the first node information exists in the current node structure data, the updated node description information in the first node information is stored under the node category in the node structure data, so as to obtain the updated node structure data.

In another optional implementation, when the addition operation for the first node information is detected, it is determined whether the node category first node information exists in the node structure data, and if it is determined that the node category in the first node information does not exist in the node structure data, the node category is added into the node structure data, and the node description information in the first node information is stored under the added node category.

In the embodiment of the present disclosure, when the addition operation for the node description information of first node information is detected, firstly it is determined whether the node category in the first node information exists in the current node structure data. Or, when the addition operation for the value of the first node information is detected, firstly it is determined whether the key of the first node information exists in the current node structure data, wherein the key is used for storing the node category. If it is determined that the node category in the first node information does not exist in the current node structure data, firstly, the node category corresponding to the first node information is added into the node structure data, and then the updated node description information in the first node information is stored under the added node category, so as to obtain the updated node structure data.

In another optional implementation manner, when the deletion operation for second node information is detected, a node category corresponding to the second node information in the node structure data is determined, and the node description information corresponding to the second node information is deleted under the node category.

In the embodiment of the present disclosure, when the deletion operation for the node description information of the second node information is detected, the node category corresponding to the second node information is directly determined in the node structure data, and the node description information corresponding to the second node information is deleted under the node category, so as to obtain the updated node structure data.

In another optional implementation, when the modification operation for third node information is detected, the node category corresponding to the third node information in the node structure data is determined, and the third node information is modified.

In an embodiment of the present disclosure, when the modification operation for the node description information of the third node information is detected, the node category corresponding to the third node information is directly determined in the node structure data, and the third node information under the node category is modified correspondingly, so as to obtain the updated node structure data.

In the embodiment of the present disclosure, in response to the operation for displaying an interaction window, the node structure data comprising the node information stored in accordance with a preset data structure is acquired; because, when the node information is updated, a corresponding update operation can be performed on the node structure data based on the preset data structure, the acquired node structure data is also the data updated in real time.

S102, displaying the target interaction window based on the node structure data and an interaction window framework.

In the embodiment of the disclosure, when the node information is updated, the updated node structure data is acquired, and the target interaction window is displayed based on the updated node structure data and the interaction window framework. Herein, the target interaction window is used for presenting the node information, and a user can view node information, add nodes, etc. on the target interaction window. The interaction window framework includes, e.g., a display style of the interaction window for setting presentation positions of the node information and the like; for example, the node category may be presented on a left side of the interaction window, the node description information may be presented on a right side of the interaction window, the control for adding nodes may be presented on a lower right corner of the interaction window, and so on.

In an optional implementation, the node description information comprises a corresponding relation between a node name and node function description information. When a target interaction window is generated based on the node structure data and the interaction window framework, the corresponding relation between the node category and the node name is filled into a two-level menu control in the interaction window framework, and the corresponding relation between the node name and the node function description information is filled into an information presentation control in the interaction window framework, and the target interaction window is displayed.

In the embodiment of the present disclosure, the node function description information is used for describing specific functions of the node, so that a user can learn the functions that the corresponding node can realize by viewing the node function description information, which facilitates the addition of nodes and the like.

When the target interaction window is generated based on the node structure data and the interaction window framework, the corresponding relation between the node category and the node name is filled into a two-level menu control in the interaction window framework, wherein, one node category corresponds to one or more node names, and the two-level menu control comprises the corresponding relation between the node category and the node name. In addition, the corresponding relation between the node name and the node function description information is filled into the information presentation control in the interaction window framework, wherein, one node name corresponds to one piece of node function description information, and the information presentation control is used for presenting the node function description information corresponding to each node name, i.e., presenting description information of one or more specific functions corresponding to each node name. Based on the two-level menu control and the information presentation control in the interaction window framework, a target interaction window is generated and the target interaction window is displayed.

In the method for displaying an interaction window provided by the embodiment of the disclosure, first, a node structure data is acquired in response to an operation for displaying an interaction window, wherein the node structure data comprises node information stored in accordance with a preset data structure, and the node structure data is used for causing the node information to be displayed in a target interaction window based on the preset data structure. Then the target interaction window is displayed based on the node structure data and an interaction window framework. In the embodiment of the present disclosure, the node information is stored in accordance with the preset data structure, and once the node information is updated, the node structure data can be updated based on the preset data structure, therefore, the node information in the target interaction window displayed based on the node structure data and the interaction window framework is updated in real time. It can be seen that in the embodiment of the present disclosure, the update of the node content on the target interaction window can be realized without the need of manually updating the software version by the user, which improves the user experience of using related software.

In an optional implementation, taking a visual programming application as an example, wherein nodes are used for implementing sub-function in the program, and the nodes are connected to implement visual programming, the node information may include a node category, a node name, node function description information, etc., wherein the node function description information includes input port configuration information, output port configuration information, etc., wherein the port is an in/out point of a connection line between the nodes, and is used for providing input data to the node and outputting a result of the node operation.

Because the node structure data does not exist in the visual programming application itself, before the node structure data is acquired in response to the operation for displaying an interaction window, in response to a startup operation of the target visual programming application, configuration files of nodes corresponding to the target visual programming application are acquired, wherein the configuration files comprise node information of the nodes. And then, the node information is stored in accordance with the preset data structure to obtain the node structure data corresponding to the target visual programming application.

In the embodiment of the present disclosure, the configuration files of the nodes are used for describing files of the nodes related to the interaction window, including node information to be displayed on the interaction window; one node has a set of corresponding configuration files, for example, the configuration files of the node include a node category (category), a node name (name), a unique identifier (id), input port configuration information (inputs), output port configuration information (outputs), node function description (description), and the like.

When receiving the startup operation for the target visual programming application, the configuration files of all the nodes are traversed and each of the configuration files is read in sequentially; before reading in the configuration files, the node structure data (map) is newly created, and the node information in the configuration files of each node is stored into the node structure data in accordance with the preset data structure, to obtain the node structure data corresponding to the target visual programming application. For example, if the preset data structure is a data structure containing a key-value pair relation, the node category (category) is stored as the key of the node structure data in accordance with the preset data structure, and then the node name (name), the unique identifier (id), the input port configuration information (inputs), the output port configuration information (outputs), and the node function description (description) are stored correspondingly as the value based on the node category, so that the node structure data (map) with the data structure of the key-value pair relation, corresponding to the target visual programming application, is acquired.

In the embodiment of the present disclosure, the configuration files of the node include not only the basic node information of the node category and the node name, but also the detailed function description information of the node that needs to be displayed on the interaction window; and in a case wherein when it is detected that the node information is updated, the configuration files of all the nodes are traversed, a dynamical update of the node information can be realized, thus the update operation on the node structure data obtained based on the configuration files of the nodes can be triggered when the node information is updated.

In an optional implementation, after the target interaction window is displayed based on the node structure data and the interaction window framework, when a keyword search operation for the node information is received on the target interaction window, a search result corresponding to the keyword search operation is acquired based on the current node structure data, and then the search result is presented on the target interaction window.

In the embodiment of the present disclosure, taking an example that the target interaction window is a target dialog box, the target dialog box is used for presenting the node information, and a user may view the node information, search for nodes, add nodes, etc. on the target dialog box. When a keyword search operation for the node information is received on the target dialog box, a search result corresponding to the keyword search operation is acquired based on the current node structure data, and then the search result is presented on the target dialog box. Herein, the search result may include the node category, the node name, the node description information, etc. Because the update operation can be performed on the node structure data when the node information is updated, the dynamic updating of the node structure data is realized, and thus the search result presented on the target dialog box is acquired based on the dynamically updated node structure data.

In an optional implementation, after the target interaction window is displayed based on the node structure data and the interaction window framework, when a target node is added on a visual programming interface based on the target interaction window, in response to a node information presentation operation for the target node, the node information corresponding to the target node is acquired from the current node structure data, and the node information is presented.

In the embodiment of the present disclosure, taking an example that the target interaction window is a target dialog box, the target dialog box is used for presenting the node information, and a user may view the node information, search for nodes, add nodes, etc. on the target dialog box. When receiving a node information presentation operation for the target node, node information corresponding to the target node is acquired from the current node structure data, and the node information is presented.

In the embodiment of the disclosure, as to the target node added on the visual programming interface based on the target interaction window, the corresponding node information can be presented, that is, a user can view the node information of the added target node by means of clicking or the like. Further, since the update operation can be performed on the node structure data when the node information is updated, the dynamic updating of the node structure data is realized, and thus, the node information corresponding to the target node, which is presented in response to the operation for presenting the node information of the target node, is acquired from the dynamically updated node structure data.

Figure 2:
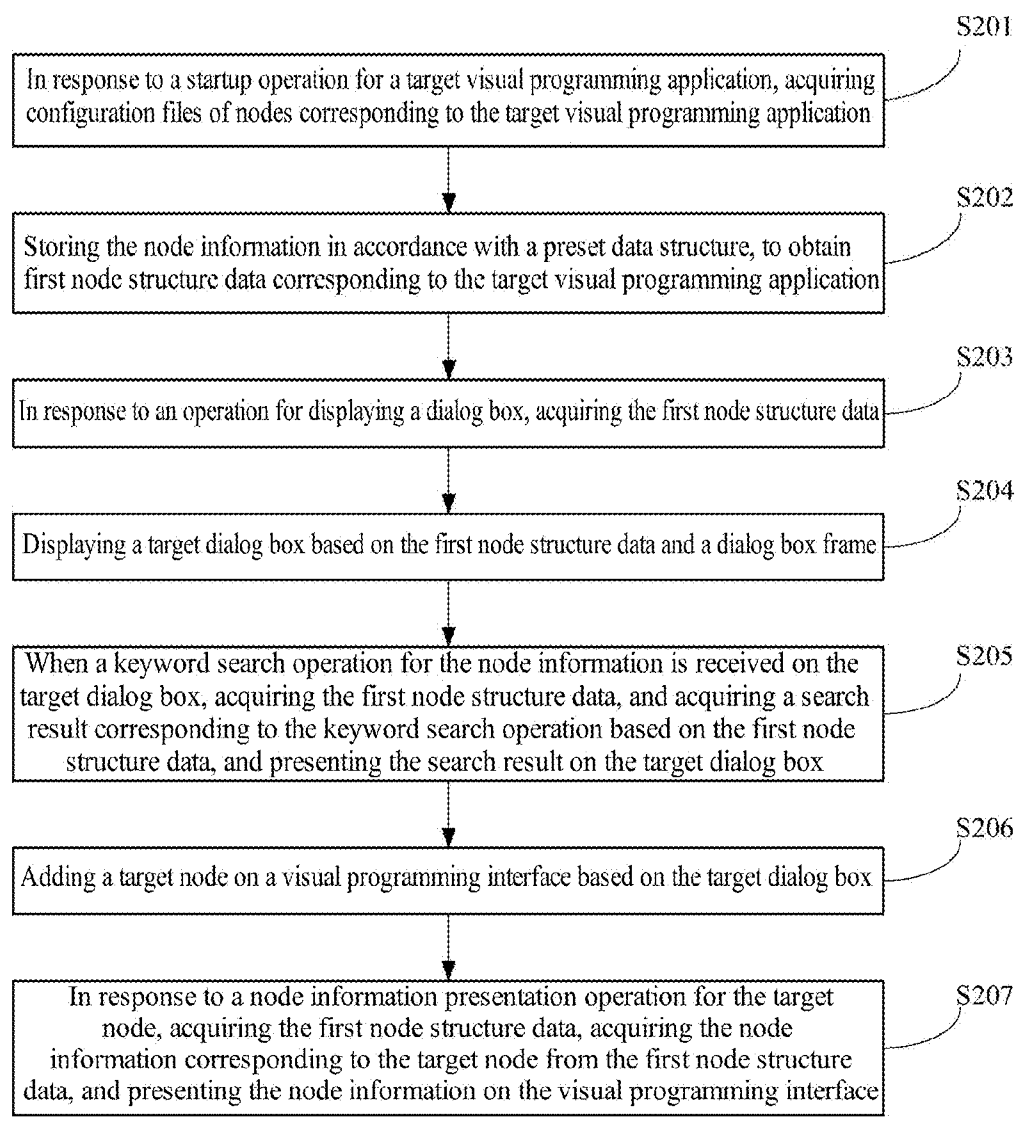
FIG. 2 is a schematic flowchart of another method for displaying an interaction window provided by an embodiment of the present disclosure.

Based on the above method for displaying an interaction windows, by taking a visual programming application as an example, wherein the nodes are used for implementing sub-functions in the program, and the nodes are connected to implement visual programming, the embodiments of the present disclosure further provide a method for displaying an interaction window, referring to FIG. 2, which is a schematic flowchart of another method for displaying an interaction window provided by an embodiment of the present disclosure, and as shown in FIG. 2, taking an example that the interaction window is a dialog box, the method comprises:

S201, in response to a startup operation for a target visual programming application, acquiring configuration files of nodes corresponding to the target visual programming application.

Herein, the configuration files includes node information of the nodes, wherein the node information may include a node category, a node name, node function description information, etc., wherein the node function description information includes input port configuration information, output port configuration information, etc., wherein the port is an in/out point of a connection line between the nodes, and is used for providing input data to the node and outputting the result of the node operation.

Figure 3:
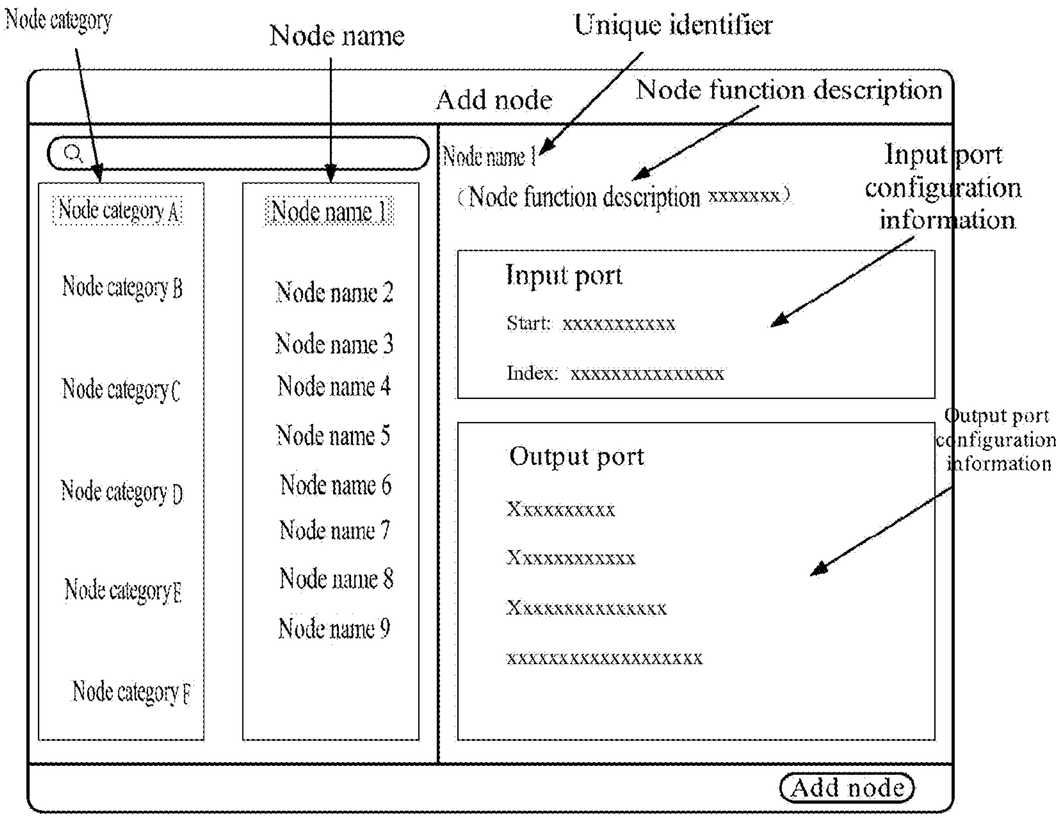
FIG. 3 is a schematic diagram of an interaction window display provided by an embodiment of the present disclosure.

In the embodiment of the present disclosure, the configuration files of the nodes are used for describing files of the nodes related to the dialog box, including node information to be displayed on the dialog box; reference is made to FIG. 3, which is a schematic diagram of a dialog box display provided by an embodiment of the present disclosure, wherein the configuration files of the nodes include a node category (category), a node name (name), a unique identifier (id), input port configuration information (inputs), output port configuration information (outputs), and node function description (description).

S202, storing the node information in accordance with the preset data structure, to obtain first node structure data corresponding to the target visual programming application.

In the embodiment of the present disclosure, the preset data structure is a data structure containing a key-value pair relation, wherein the key in the key-value pair relation is used for storing the node category, and the value in the key-value pair relation is used for storing the node description information. The node category (category) is stored as the key of the node structure data in accordance with the preset data structure, and the node name (name), the unique identifier (id), the input port configuration information (inputs), the output port configuration information (outputs), and the node function description (description) are stored correspondingly as the value based on the node category, so that the first node structure data with the data structure of the key-value pair relation, corresponding to the target visual programming application, is acquired.

S203, in response to an operation for displaying a dialog box, acquiring the first node structure data.

Herein, the node structure data comprises the node information stored in accordance with the preset data structure, and the node structure data is used for causing the node information to be displayed in a target dialog box based on the preset data structure.

In the embodiment of the present disclosure, when the operation for displaying the dialog box is received, the first node structure data acquired after the node information is stored in accordance with the data structure of the key-value pair relation in S202 is acquired, and when the node information is updated, an update operation can be performed on the first node structure data based on the preset data structure, so that the update of the node information is synchronized into the node data structure, to realize a dynamic update of the node data structure.

In the embodiment of the present disclosure, for example, when there is an addition operation for first node information, it is determined whether a node category corresponding to the first node information exists in the first node structure data, and if so, the node description information in the first node information is stored in the corresponding node category in the first node structure data, to generate a second node structure data. If not, firstly, the node category corresponding to the first node information is added in the first node structure data, and then the node description information in the first node information is stored in the added node category, to generate a second node structure data.

S204, displaying a target dialog box based on the first node structure data and a dialog box frame.

In the embodiment of the present disclosure, the target dialog box is used for presenting the node information, and a user can view the node information, search for nodes, add nodes, etc. on the target dialog box; and the dialog box frame includes, e.g., a display style of the dialog box for setting presentation positions of the node information and the like, for example, a UI style; reference is made to FIG. 3, wherein the node category is presented on a left side of the dialog box, the node description information is presented on a right side of the dialog box, a control for adding nodes is presented on a lower right corner of the dialog box, and a search bar for searching for a node is presented on an upper left corner of the dialog box, and so on. Herein, the corresponding relation between the node category (category) and the node name (name) is filled into a two-level menu control in the dialog box frame, and the corresponding relation between the node name (name) and the node function description information (including a unique identifier (id), input port configuration information (inputs), output port configuration information (outputs), and node function description (description)) is filled into an information presentation control in the dialog box frame, and the target dialog box is displayed based on the first node structure data and the dialog box frame in FIG. 3.

S205, when a keyword search operation for the node information is received on the target dialog box, acquiring the first node structure data, and acquiring a search result corresponding to the keyword search operation based on the first node structure data, and presenting the search result on the target dialog box.

In the embodiment of the present disclosure, the search result may include a node corresponding to a certain node category, the node description information corresponding to a certain node, etc.; and because an update operation can be performed on the node structure data when the node information is updated, the node structure data is dynamically updated, and thus the search result presented on the target dialog box is acquired based on the dynamically updated node structure data.

S206, adding a target node on a visual programming interface based on the target dialog box.

In the embodiment of the present disclosure, after a target node is selected in the target dialog box, the target node can be added to the visual programming interface in various ways, for example, Way 1, of double-clicking the target node to add it to the visual programming interface; Way 2, after the target node is selected, triggering an 'Add Node' button to add it to the visual programming interface; and so on.

S207, in response to a node information presentation operation for the target node, acquiring the first node structure data, acquiring the node information corresponding to the target node from the first node structure data, and presenting the node information on the visual programming interface.

In the embodiment of the disclosure, when an operation for presenting information of the target node is received, the first node structure data is acquired, the node information corresponding to the target node is acquired from the first node structure data, and the node information is presented. Because the update operation can be performed on the node structure data when the node information is updated, a dynamical update of the node structure data is realized, and thus, the node information corresponding to the target node, which is presented in response to the operation for presenting the node information of the target node, is acquired from the dynamically updated node structure data.

Figure 4:
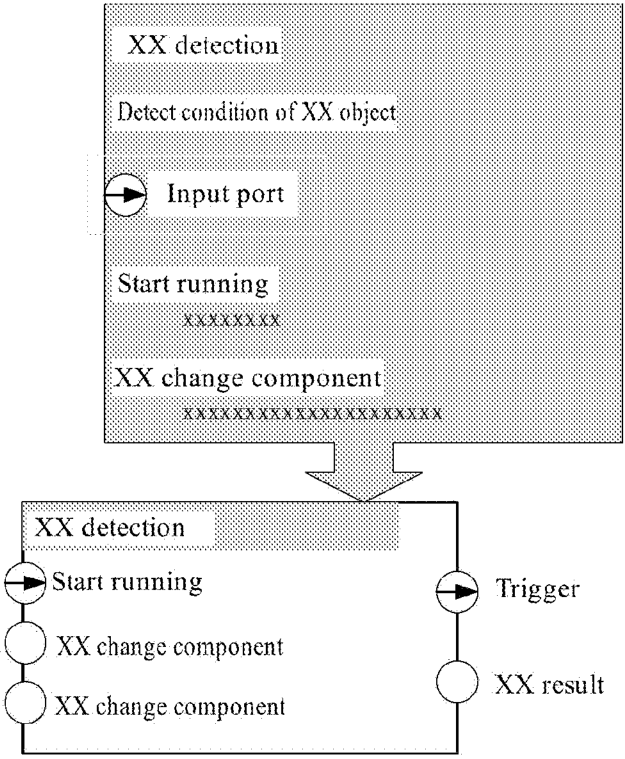
FIG. 4 is a schematic diagram of a node information presentation provided by an embodiment of the present disclosure.

Reference is made to FIG. 4, which is a schematic diagram of a node information presentation provided by an embodiment of the present disclosure; by taking a target node "XX detection" that has been added to the visual programming interface as an example, when the cursor is moved onto the target node, the node function description information of the target node may be presented, which makes it convenient for a user to view specific function description of the target node when using the target node.

It should be noted that, after S204, S206-S207 may be executed before S205, that is, after the target dialog box is displayed, any target node can be added on the visual programming interface based on the target t dialog box, and the node information thereof is presented.

The embodiment of the disclosure provides a method for displaying an interaction window comprising, first, in response to a startup operation for a target visual programming application, acquiring configuration files of nodes corresponding to the target visual programming application, wherein the configuration files comprise node information of the nodes; and storing the node information in accordance with a preset data structure, to obtain node structure data corresponding to the target visual programming application; then, when the node information is updated, it is triggered to perform an update operation on the node structure data; and then displaying a target interaction window based on the node structure data and an interaction window framework. As can be seen, in the embodiment of the present disclosure, the node information in the target interaction window displayed based on the node structure data is updated in real time. Further, after the target interaction window is displayed, a search result corresponding to a keyword search operation can be acquired based on the node structure data, and the node information corresponding to a target node can be acquired from the node structure data; and since the node structure data can be dynamically updated, the presented search result and node information both are acquired based on the dynamically updated node structure data. It can be seen that, in the embodiments of the present disclosure, the update of the node content on the target interaction window can be realized without the need of updating the software version, which improves the user experience in using related software.

Figures 5, 6:
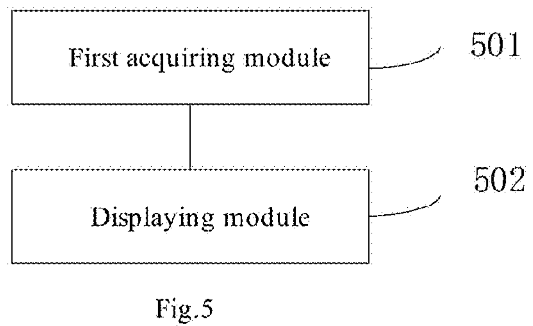
FIG. 5 is a schematic structural diagram of an apparatus for displaying an interaction window provided by an embodiment of the present disclosure.
FIG. 6 is a schematic structural diagram of a device for displaying an interaction window provided by an embodiment of the present disclosure.

Based on the above method embodiments, the present disclosure further provides an apparatus for displaying an interaction window; reference is made to FIG. 5, which is a schematic structural diagram of an apparatus for displaying an interaction window provided by an embodiment of the present disclosure, the apparatus comprises:

a first acquiring module 501 configured to, in response to an operation for displaying an interaction window, acquire node structure data; wherein the node structure data comprises node information stored in accordance with a preset data structure, and the node structure data is used for causing the node information to be displayed in a target interaction window based on the preset data structure; and a displaying module 502 configured to display the target interaction window based on the node structure data and an interaction window framework.

In an optional implementation, the node information comprises a mapping relation between a node category and node description information.

In an optional implementation, the apparatus further comprises:

an adding module configured to, when an addition operation for first node information is detected, determine whether a node category included in the first node information exists in the node structure data;

a first storing module configured to, if it is determined that the node category included in the first node information exists in the node structure data, store node description information included in the first node information under the node category in the node structure data; and a second storing module configured to, if it is determined that the node category included in the first node information does not exist in the node structure data, add the node category into the node structure data, and store the node description information included in the first node information under the added node category.

In an optional implementation, the apparatus further comprises:

a deleting module configured to, when a deletion operation for second node information is detected, determine a node category included in the second node information in the node structure data, and delete node description information included in the second node information under the node category.

In an optional implementation, the node description information comprises a corresponding relation between a node name and node function description information; and the displaying module 502 comprises:

a filling submodule configured to fill a corresponding relation between the node category and the node name in the node description information into a two-level menu control in the interaction window framework, and fill the corresponding relation between the node name and the node function description information into an information presentation control in the interaction window framework, to generate the target interaction window; and a displaying submodule configured to display the target interaction window.

In an optional implementation, the preset data structure is a data structure containing a key-value pair relation, wherein the key in the key-value pair relation is used for storing the node category, and the value in the key-value pair relation is used for storing the node description information.

In an optional implementation, the apparatus further comprises:

a second acquiring module configured to, in response to a startup operation for a target visual programming application, acquire configuration files of nodes corresponding to the target visual programming application; wherein the configuration files include the node information of the nodes; and a third storing module configured to, store the node information in accordance with the preset data structure, to obtain the node structure data corresponding to the target visual programming application.

In an optional implementation, the apparatus further comprises:

a third acquiring module configured to, when a keyword search operation for the node information is received on the target interaction window, acquire a search result corresponding to the keyword search operation based on the node structure data; and a first presenting module configured to present the search result on the target interaction window.

In an optional implementation, the apparatus further comprises:

an adding module configured to, add a target node on a visual programming interface based on the target interaction window;

a fourth acquiring module configured to, in response to a node information presentation operation for the target node, acquire node information corresponding to the target node from the node structure data; and a second presenting module configured to present the node information on the visual programming interface.

The apparatus for displaying an interaction window provided by the embodiment of the disclosure first acquires node structure data in response to an operation for displaying an interaction window, wherein, the node structure data includes node information stored in accordance with a preset data structure, and the node structure data is used for causing the node information to be displayed in a target interaction window based on the preset data structure. Then, based on the node structure data and an interaction window framework, the target interaction window is displayed. In the method for displaying an interaction window provided by the embodiment of the disclosure, the node information is stored in accordance with the preset data structure, and once the node information is updated, the node structure data can be updated based on the preset data structure, thus the node information in the target interaction window displayed based on the node structure data is updated in real time. It can be seen that in the embodiments of the present disclosure, the update of the node content on the target interaction window can be realized without the need of updating the software version, which improves the user experience in using related software.

In addition to the method and apparatus described above, the embodiments of the present disclosure further provide a non-transitory computer-readable storage medium having thereon stored instructions which, when executed on a terminal device, cause the terminal device to implement the method for displaying an interaction window in accordance with the embodiments of the present disclosure.

The embodiments of the present disclosure further provide a computer program product comprising a computer program/instructions which, when executed by a processor, implements/implement the method for displaying an interaction window in accordance with the embodiments of the present disclosure.

In addition, the embodiments of the present disclosure further provide a device for displaying an interaction window; and as shown in FIG. 6, the device comprises: a processor 601, a memory 602, an input device 603, and an output device 604. The number of the processors 601 in the device for displaying an interaction window may be one or more, and one processor is illustrated in FIG. 6. In some embodiments of the present disclosure, the processor 601, the memory 602, the input device 603 and the output device 604 may be connected by a bus or otherwise, wherein the connection by a bus is illustrated in FIG. 6.

The memory 602 may be used for storing software programs and modules, and the processor 601 executes various functional applications and data processing of the device for displaying an interaction window by running the software programs and modules stored in the memory 602. The memory 602 may mainly include a program storage area and a data storage area, wherein the program storage area may store an operating system, an application program required for at least one function, and the like. Further, the memory 602 may include a cache memory, and may also include a non-volatile memory, such as at least one magnetic disk storage device, flash memory device, or other volatile solid-state storage device. The input device 603 may be used for receiving input numeric or character information and generating signal inputs related to user settings and function control of the device for displaying an interaction window.

Specifically, in this embodiment, the processor 601 loads executable files corresponding to a process of one or more application programs into the memory 602 in accordance with the following instructions, and the processor 601 runs the application programs stored in the memory 602, thereby realizing various functions of the above-mentioned interaction window display device.

It is noted that, in this disclosure, relational terms such as "first" and "second," and the like, are used solely for distinguishing one entity or action from another entity or action without necessarily requiring or implying any actual such relation or order between such entities or actions. Also, the terms "comprise", "include" or any other variation thereof, are intended to cover a non-exclusive inclusion, such that a process, method, article, or apparatus that comprises a list of elements not only includes those elements but also includes other elements not expressly listed or inherent to such process, method, article, or apparatus. Without further limitation, an element defined by the phrase "comprising an . . . " does not exclude the presence of other identical elements in the process, method, article, or apparatus that comprises the element.

The above is only for the purpose of describing particular embodiments of the present disclosure, so as to enable those skilled in the art to understand or implement the present disclosure. Various modifications to these embodiments will be apparent to those skilled in the art, and the generic principles defined herein may be applied to other embodiments without departing from the spirit or scope of the present disclosure. Thus, the present disclosure is not intended to be limited to the embodiments described herein but is to be accorded the widest scope consistent with the principles and novel features disclosed herein.

What is claimed is:

1. A method for displaying an interaction window, comprising:

in response to a startup operation for a visual programming application, acquiring configuration files of nodes corresponding to the visual programming application; wherein the configuration files comprise node information of the nodes;

storing the node information in accordance with a preset data structure, to obtain node structure data corresponding to the visual programming application;

in response to an operation for displaying an interaction window, acquiring the node structure data; wherein the node structure data comprises the node information stored in accordance with the preset data structure, and the node structure data is used for causing the node information to be displayed in the interaction window based on the preset data structure; and displaying the interaction window based on the node structure data and an interaction window framework.

2. The method according to claim 1, wherein the node information comprises a mapping relation between a node category and node description information.

3. The method according to claim 2, wherein the method further comprises:

in response to detecting an addition operation for first node information, determining whether a node category comprised in the first node information exists in the node structure data;

if it is determined that the node category comprised in the first node information exists in the node structure data, storing node description information comprised in the first node information under the node category in the node structure data; and if it is determined that the node category comprised in the first node information does not exist in the node structure data, adding the node category into the node structure data, and storing the node description information comprised in the first node information under the added node category.

4. The method according to claim 2, wherein the method further comprises:

in response to detecting a deletion operation for second node information, determining a node category comprised in the second node information in the node structure data, and deleting node description information comprised in the second node information under the node category.

5. The method according to claim 2, wherein the node description information comprises a corresponding relation between a node name and node function description information; and the displaying the interaction window based on the node structure data and the interaction window framework comprises:

filling a corresponding relation between the node category and the node name in the node description information into a two-level menu control in the interaction window framework, and filling the corresponding relation between the node name and the node function description information into an information presentation control in the interaction window framework, to generate the interaction window; and displaying the interaction window.

6. The method according to claim 2, wherein the preset data structure is a data structure containing a key-value pair relation, wherein the key in the key-value pair relation is used for storing the node category, and the value in the key-value pair relation is used for storing the node description information.

7. The method according to claim 1, further comprises: after the displaying the interaction window based on the node structure data and the interaction window framework, in response to receiving a keyword search operation for the node information on the interaction window, acquiring a search result corresponding to the keyword search operation based on the node structure data; and presenting the search result on the interaction window.

8. The method according to claim 1, further comprises: after the displaying the interaction window based on the node structure data and the interaction window framework, adding a first node on a visual programming interface based on the interaction window;

in response to a node information presentation operation for the first node, acquiring the node information corresponding to the first node from the node structure data; and presenting the node information on the visual programming interface.

9. The method according to claim 1, wherein in response to the node information being updated, the node structure data is dynamically updated.

10. A non-transitory computer-readable storage medium having stored thereon instructions which, when executed on a terminal device, cause the terminal device to implement the following operations for displaying an interaction window:

in response to a startup operation for a visual programming application, acquiring configuration files of nodes corresponding to the visual programming application; wherein the configuration files comprise node information of the nodes;

storing the node information in accordance with a preset data structure, to obtain node structure data corresponding to the visual programming application;

in response to an operation for displaying an interaction window, acquiring the node structure data; wherein the node structure data comprises the node information stored in accordance with the preset data structure, and the node structure data is used for causing the node information to be displayed in the interaction window based on the preset data structure; and displaying the interaction window based on the node structure data and an interaction window framework.

11. The non-transitory computer-readable storage medium according to claim 10, wherein the node information comprises a mapping relation between a node category and node description information.

12. The non-transitory computer-readable storage medium according to claim 11, wherein the instructions, when executed on the terminal device, cause the terminal device to further implement the following operations:

in response to detecting an addition operation for first node information, determining whether a node category comprised in the first node information exists in the node structure data;

if it is determined that the node category comprised in the first node information exists in the node structure data, storing node description information comprised in the first node information under the node category in the node structure data; and if it is determined that the node category comprised in the first node information does not exist in the node structure data, adding the node category into the node structure data, and storing the node description information comprised in the first node information under the added node category.

13. The non-transitory computer-readable storage medium according to claim 11, wherein the instructions, when executed on the terminal device, cause the terminal device to further implement the following operations:

in response to detecting a deletion operation for second node information, determining a node category comprised in the second node information in the node structure data, and deleting node description information comprised in the second node information under the node category.

14. The non-transitory computer-readable storage medium according to claim 11, wherein the node description information comprises a corresponding relation between a node name and node function description information; and the displaying the interaction window based on the node structure data and the interaction window framework comprises:

filling a corresponding relation between the node category and the node name in the node description information into a two-level menu control in the interaction window framework, and filling the corresponding relation between the node name and the node function description information into an information presentation control in the interaction window framework, to generate the interaction window; and displaying the interaction window.

15. A device comprising: a processor, and a memory on which a computer program is stored, wherein the computer program, when executed by the processor, causes the processor to implement the following operations for displaying an interaction window:

in response to a startup operation for a visual programming application, acquiring configuration files of nodes corresponding to the visual programming application; wherein the configuration files comprise node information of the nodes;

storing the node information in accordance with a preset data structure, to obtain node structure data corresponding to the visual programming application;

in response to an operation for displaying an interaction window, acquiring the node structure data; wherein the node structure data comprises the node information stored in accordance with the preset data structure, and the node structure data is used for causing the node information to be displayed in the interaction window based on the preset data structure; and displaying the interaction window based on the node structure data and an interaction window framework.

16. The device according to claim 15, wherein the node information comprises a mapping relation between a node category and node description information.

17. The device according to claim 16, wherein the computer program, when executed by the processor, causes the processor to further implement the following operations:

in response to detecting an addition operation for first node information, determining whether a node category comprised in the first node information exists in the node structure data;

if it is determined that the node category comprised in the first node information exists in the node structure data, storing node description information comprised in the first node information under the node category in the node structure data; and if it is determined that the node category comprised in the first node information does not exist in the node structure data, adding the node category into the node structure data, and storing the node description information comprised in the first node information under the added node category.

18. The device according to claim 16, wherein the computer program, when executed by the processor, causes the processor to further implement the following operations:

in response to detecting a deletion operation for second node information, determining a node category comprised in the second node information in the node structure data, and deleting node description information comprised in the second node information under the node category.

19. The device according to claim 16, wherein the node description information comprises a corresponding relation between a node name and node function description information; and the displaying the interaction window based on the node structure data and the interaction window framework comprises:

filling a corresponding relation between the node category and the node name in the node description information into a two-level menu control in the interaction window framework, and filling the corresponding relation between the node name and the node function description information into an information presentation control in the interaction window framework, to generate the interaction window; and displaying the interaction window.

* * * * *